United States Patent
Froehlich

[11] Patent Number: 5,996,752
[45] Date of Patent: Dec. 7, 1999

[54] HAND CONTROL FOR MOTOR VEHICLE CLUTCH

[76] Inventor: Juan Froehlich, 124 Cottage Ave., Albany, N.Y. 12203

[21] Appl. No.: 09/118,257

[22] Filed: Jul. 17, 1998

[51] Int. Cl.$^6$ ................................................ B60K 41/22
[52] U.S. Cl. ............................... 192/3.62; 74/481; 74/523
[58] Field of Search .................. 74/523, 481; 200/61.88; 192/3.51, 3.61, 3.62

[56] References Cited

U.S. PATENT DOCUMENTS

| | | | |
|---|---|---|---|
| 1,806,158 | 5/1931 | Giger | 192/3.51 |
| 3,435,929 | 4/1969 | Thompson | 192/3.51 |
| 4,078,628 | 3/1978 | Reichenberger | 180/77 |
| 4,505,364 | 3/1985 | Goucher et al. | 477/83 |
| 4,790,177 | 12/1988 | King et al. | 73/117 |
| 5,002,166 | 3/1991 | Leigh-Monstevens et al. | 192/3.58 |
| 5,012,689 | 5/1991 | Smith | 74/89.17 |
| 5,129,492 | 7/1992 | Lenz et al. | 192/1.52 |
| 5,363,946 | 11/1994 | Chang | 192/358 |
| 5,603,674 | 2/1997 | Rivas et al. | 477/170 |
| 5,662,002 | 9/1997 | Venturini | 74/484 |
| 5,666,857 | 9/1997 | Sebazco | 74/481 |

*Primary Examiner*—Rodney H. Bonck
*Assistant Examiner*—Saul Rodriguez
*Attorney, Agent, or Firm*—Charles A. Taylor

[57] ABSTRACT

A motor vehicle clutch hand control for the assistance of handicapped drivers, especially those handicapped in the lower limbs, is provided. The system includes a hand control valve mounted on the gear shift lever for operating a piston controlling the position of the clutch pedal and thereby engaging and disengaging the clutch, an air storage cylinder pressurized to provide operating air for the control system, an air distribution system for transmitting commands from the hand control to the clutch pedal air operated piston and a means for recharging the pressurized air storage cylinder. The hand control system may be employed in any motor vehicle with a mechanical gear box.

6 Claims, 1 Drawing Sheet

HAND CONTROL FOR MOTOR VEHICLE CLUTCH

BACKGROUND OF THE INVENTION

1. Field of the Invention

The invention relates to operating the clutch pedal for a motor vehicle having a manual transmission by handicapped drivers who have lost the functional mobility of the lower extremities.

2. Description of the Related Art

Conventional motor vehicles in corporate foot controls, a typical motor vehicle with an automatic transmission having accelerator and brake pedals and a manual transmission having accelerator, brake and clutch pedals. To permit operation by handicapped persons having restricted or no use of their legs, such vehicles may be fitted with hand controls which permit hand operation of the accelerator and brake pedals, however there are no similar hand controls for hand operation of the clutch pedal. Handicapped persons are normally restricted to the use of automatic transmission vehicles.

The majority of hand controls which have been considered previously utilize systems of levers and push rods of varying complexity, and are installed in the motor vehicle in various ways In U.S. Pat. No. 5,666,857 issued to Sebazco in 1997 is disclosed a steering and braking control system. This invention provides a means to brake a car without use of the brake pedal, and does not address the activation of a clutch. U.S. Pat. No. 5,662,002 issued to Venturini in 1997 discloses a control device mounted within the steering wheel for control of acceleration and braking. This device is not used for operating the clutch or clutch pedal. This device uses levers in the steering wheel which activate electrical controls for control of the automobile.

U.S. Pat. No. 5,603,674 issued in 1997 to Rivas discloses a set of vehicle controls for brake, clutch and accelerator pedals. The accelerator control is mounted on the steering wheel and the brake and clutch controls are mounted on the gear shift level. Signals are transmitted electrically from the control to a motor with a wire-free connection to operate the pedal. This patent uses an electronic control unit to send a signal to an electrical motor which then operates a which to move selected pedal. Chang in U.S. Pat. No. 5,363,946 issued in 1994 discloses a system for automatic operation of a clutch pump in place of a conventional clutch pedal. This invention uses compressed air to operate a clutch pump which directly operates the clutch and eliminates the use of the clutch pedal. Lenz in U.S. Pat. No. 5,129,492 issued in 1992 demonstrates a hand control device mounted on the steering column, but which controls only the acceleration and braking systems. This invention does not operate the clutch.

Parson's U.S. Pat. No. 5,038,901 issued in 1991 discloses a clutch control system which is activated by control of the gear shift level. When pressure is applied to the gear knob control an electrical signal is sent to the clutch control automatically disengaging the clutch. A second electrical signal is sent when the new gear is selected and the clutch is again engaged. This invention operates directly on the clutch and does not operate the clutch pedal. U.S. Pat. No. 5,012,689 by Smith issued in 1991 discloses a apparatus for depressing a foot pedal. The operator sends an electrical signal to a motor which moves a rod connected to the pedal and the rod moves the pedal. This invention is mounted on the floor directly under the driver and connected to the seat. It uses electrical and mechanical means to move the pedals.

U.S. Pat. No. 4,790,177 by King 1988 discloses a shifting control for an automated manual transmission shifter. This invention relates to an electronic control system and does not address the actual moving of the vehicle pedals. Reichenberger's U.S. Pat. No. 4,078,628 issued in 1978 discloses a double wheel control system for controlling brake pedal and accelerator pedal, however it does not address the clutch pedal.

SUMMARY

The object of the present invention is a motor vehicle clutch pedal control for the assistance of handicapped drivers in driving said vehicles, especially drivers handicapped in the lower limbs.

Most known control systems are designed to be adapted to vehicles provided with an automatic gear box, which substantially increases the cost of the equipped vehicle and restricts the choice of models and even makes. The object of the invention is to provide a system which can be easily adapted to cars with a mechanical gear box and pedal assembly, without altering the structural elements.

Another object of the invention is to provide a system which is modular and can therefore be used in any vehicle with a mechanical gear box.

Yet another object of the invention is to provide a system which allows the handicapped user to experience sensations identical to those of driving a normal vehicle. The invention also aims to provide a system that allows all the flexibility and performance of the vehicle to be maintained, and which enables normal driving with pedals by a non-handicapped person, or driving by a handicapped person, which makes the vehicle equipped with this invention universal. To this end the system according to one embodiment of the invention is essentially characterized in that it comprises: a hand control valve mounted on the gear shift lever for operating a piston controlling the position of the clutch pedal and thereby engaging and disengaging the clutch, an air storage cylinder pressurized to provide operating air for the control system, an air distribution system for transmitting commands from the hand control to the clutch pedal air-operated piston and an air compressor means for recharging the pressurized air storage cylinder.

DRAWING DESCRIPTION

FIG. 1 is a schematic representation of the system using pressurized air according to a first embodiment of the invention.

DETAILED DESCRIPTION

Figure 1:
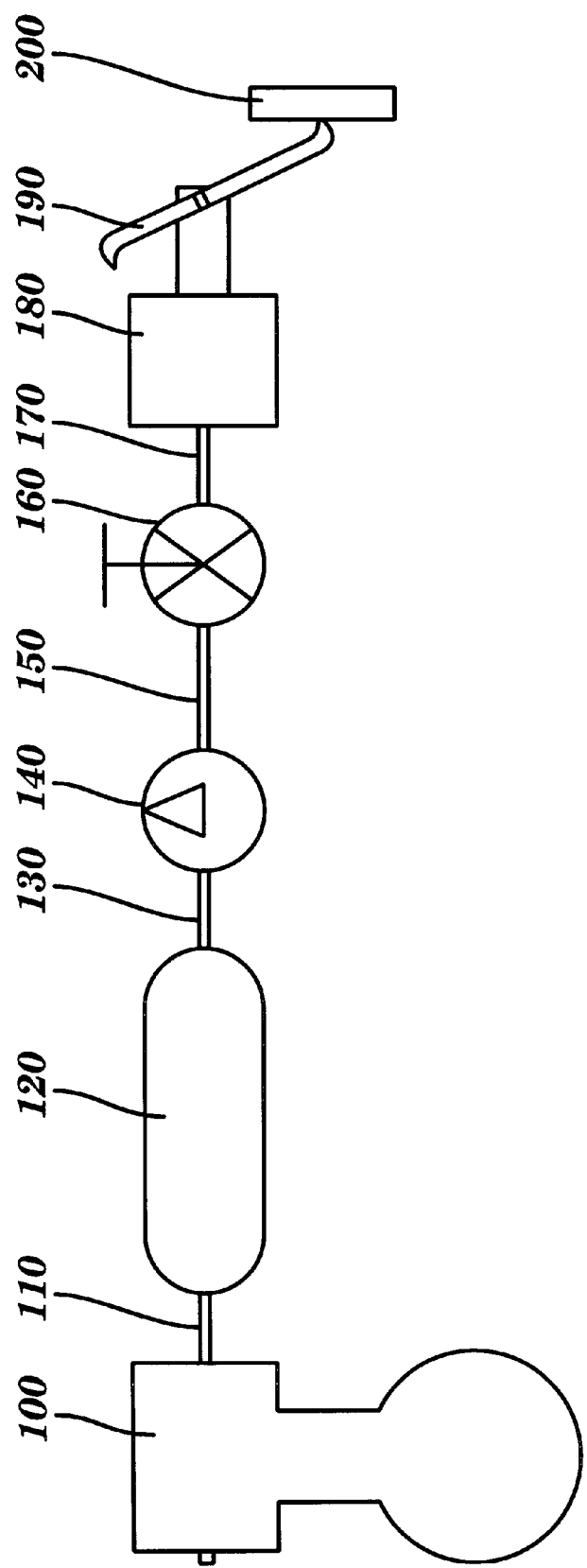

As represented in FIG. 1, the first embodiment system according to the invention comprises an air compressor 100 for supplying pressurized air through a first air distribution system 110 to a storage device 120. Said storage device 120 supplies pressurized air through a second air distribution system 130 to an adjustable pressure regulator 140 which takes the high pressure air from air storage device 120 and reduces it to a regulated air pressure sufficient to operate a pedal activation device 180. The adjustable pressure regulator 140 supplies regulated air through a third air distribution system 150 to a hand control valve 160 mounted on the gear shift lever. Operation of the hand control valve 160 supplies regulated air through a fourth air distribution system 170 to operate a pedal activation device 180. The pedal activation device is pivotally connected to the motor vehicle clutch pedal 200 whereby operation of the pedal activation device 180 causes in a change in the position of the clutch pedal 200 thereby engaging and disengaging the clutch and allowing a driver to shift gears in the motor vehicle.

The air compressor 100 can be housed in the engine compartment of the vehicle or any desired location. Further, it can be mechanically driven by the vehicle engine directly or through a fan belt or electrically driven through the vehicle electrical system.

Likewise, the air storage device can be housed in the engine compartment, under the dash or any convenient location in the vehicle. The adjustable pressure regulator 140 would be installed at a location where the driver could see it and regulate the air pressure as required to operate the pedal activation device 180. The hand control valve 160 would be mechanically attached to the gear shift to allow the driver to operate the valve while operating the gear shift level. The pedal activation device 180 can be mounted on the floor or under the dashboard of the motor vehicle in a position to allow the pedal activation device 180 to be pivotally connected to the clutch pedal 200 and to operate the clutch pedal 200 while allowing a non-handicapped driver to manually use the clutch pedal 200.

The preferred embodiments of the present invention disclosed herein have been discussed for the purpose of familiarizing the reader with the novel aspects of the invention. Although preferred embodiments of this invention have been shown, many changes, modifications, and substitutions may be made by one having ordinary skill in the art without departing from the scope and spirit of the invention as described in the following claims.

I claim:

1. A hand control device for a driver operating the clutch pedal of a manual transmission shift system of a motor vehicle having a gear shift and a clutch pedal for engaging and disengaging the clutch, said hand control device comprising:

an air compressor for supplying pressurized air through a first air distribution system to a storage device wherein said storage device supplies pressurized air;

an adjustable pressure regulator which takes the high pressure air through a second air distribution system from said air storage device and reduces it to a regulated air pressure;

a hand control valve mechanically mounted on a gear shift lever, said hand control valve receives air from said adjustable pressure regulator through a third air distribution system, whereby operation of said hand control valve supplies air to a fourth air distribution system;

a pedal activation device pivotally connected to the clutch pedal, whereby regulated air from said fourth air distribution system operates said pedal activation device and thereby causes in a change in the position of the clutch pedal thereby engaging and disengaging the clutch and allowing a driver to shift gears in the motor vehicle.

2. The device according to claim 1, wherein the air compressor is electrically operated.

3. The device according to claim 1, wherein the air compressor is driven by an engine fan belt.

4. The device according to claim 2, wherein the adjustable pressure regulator is directly attached to the air storage tank.

5. The device according to claim 3, wherein the adjustable pressure regulator is directly attached to the air storage tank.

6. The device according to claim 1, wherein the air control valve is activated by pressing a button on the hand control.

\* \* \* \* \*